United States Patent [19]

Funabiki et al.

[11] 4,157,993
[45] Jun. 12, 1979

[54] RESIN-COATED SAND COMPOSITIONS

[75] Inventors: Kyohei Funabiki; Noriaki Matsushima; Naomitsu Inoue, all of Fujieda, Japan

[73] Assignee: Sumitomo Durez Company, Ltd., Tokyo, Japan

[21] Appl. No.: 863,546

[22] Filed: Dec. 22, 1977

[30] Foreign Application Priority Data

Dec. 23, 1976 [JP] Japan .................................. 51/154294

[51] Int. Cl.$^2$ ............................................. C08L 91/00
[52] U.S. Cl. ...................................... 260/28 P; 164/43; 260/19 R; 260/19 N; 260/19 A; 260/25; 260/28 R; 260/326 R; 260/33.4 R; 260/38; 260/831; 260/848
[58] Field of Search ............... 260/38, DIG. 40, 28 P, 260/28 R, 33.4, 32.6, 25, 19 R, 19 N, 19 A, 848, 831; 164/43

[56] References Cited

U.S. PATENT DOCUMENTS

| | | | |
|---|---|---|---|
| 2,813,840 | 11/1957 | Salzberg | 260/28 P |
| 2,888,418 | 5/1959 | Albanese et al. | 428/404 |
| 3,850,874 | 11/1974 | Grazen et al. | 260/38 |
| 3,857,811 | 12/1974 | Grazen et al. | 260/38 |
| 3,944,514 | 3/1976 | Nishiyama et al. | 260/38 |
| 3,993,620 | 11/1976 | Yamanishi et al. | 260/38 |

*Primary Examiner*—Melvyn I. Marquis
*Attorney, Agent, or Firm*—Peter F. Casella; James F. Mudd; David A. Stein

[57] ABSTRACT

This invention relates to resin-coated sand compositions useful in the preparation of foundry sand cores and molds comprising sand, a solid novalac resin, a lubricant-containing solid resole resin, and optionally, hexamethylenetetramine in an amount of up to about 5 parts by weight based on 100 parts by weight of the total amount of resin.

15 Claims, No Drawings

RESIN-COATED SAND COMPOSITIONS

BACKGROUND OF THE INVENTION

This invention is directed to resin-coated sand compositions and a process for the preparation thereof, and more particularly, to a process for producing resin-coated sand compositions substantially free of nitrogen by the dry hot coating method. The compositions thus prepared are suitable for manufacturing foundry sand cores and molds.

Conventional resin-coated sand compositions have been typically prepared by the dry hot coating method by mixing heated sand particles with a novolac phenolic resin (hereinafter referred to as a novolac resin) in the form of an agitated aqueous solution, adding hexamethylenetetramine (hereinafter referred to as hexamine) as a hardening agent, in an amount of 10 to 15 parts by weight with respect to 100 parts by weight of resin, and further adding calcium stearate.

Such resin-coated sand compositions produced with novolac resins and hexamine exhibit fast curing and excellent flow, but are also often associated with certain drawbacks such as pollution problems and defects in the cast products, such as pinholes or blow holes resulting from the presence of nitrogen compounds, such as ammonia or formaldehyde, generated by the pyrolysis of hexamine when the resin-coated sand compositions are used in iron or steel casting or when forming molds.

In order to avoid such problems, various attempts have been made to employ a shell molding resin with a very low nitrogen content when using dry hot coating methods. A representative attempt in this direction is the use of a solid resole phenolic resin obtained with an ammonia catalyst (hereinafter referred to as a solid ammonia resole resin).

This method is, however, associated with certain drawbacks such as slower hardening as compared to novolac resins cured with hexamine, and unsatisfactory flow (insufficient hot flow) resulting from premature local curing before the sand particles become well-coated in the course of mulling. As a result, the cured articles frequently exhibit significantly lower physical strength than those obtained with a novolac resin and hexamine, and, therefore, this method has not been extensively employed in practice. A method has also been proposed for controlling the degree of reaction of a solid ammonia resole resin in the earlier stages of reaction in order to accelerate the hardening. However, this method still results in insufficient hot flow and thus in insufficient strength of the molded articles.

In addition, a method has been proposed for using a solid ammonia resole resin as a curing agent for novolac resins. This method, though effective for improving the physical strength of the molded article, is associated with the serious drawback of slow curing.

The present inventors have found that these problems can be solved by using, as a curing agent for novolac resins, a lubricant-containing solid resole phenolic resin having a higher content of methylol radicals (hereinafter referred to as a lubricant-containing solid resole resin). The presence of a lubricant in the resin elevates the apparent melting point and thus improves its resistance against blocking.

As this method provides a solid resole resin having a high degree of reactivity (with a higher content of methylol radicals), it is possible to obtain a coated sand composition with a fast curing speed and with a higher crosslinking density. Also, the uniform distribution of lubricant in the solid resole resin assures an improvement in hot flow and uniform mixing with the novolac resin.

Accordingly, it is an object of the present invention to provide a process for producing a resin-coated sand composition having good physical strength and rapid curing by means of the dry hot coating method.

Another object of the present invention is to provide a process for producing a resin-coated sand composition capable of substantially eliminating gas defects in cast products and also capable of preventing the various associated pollution problems.

A still further object of the present invention is to provide a process which utilizes a stable supply of a reactive binder substantially free of blocking characteristics and which provides for the simplified preparation of a more reactive solid resole resin.

SUMMARY OF THE INVENTION

The present inventors have now succeeded in developing an improved foundry sand composition comprising sand, a solid novolac resin, a lubricant-containing solid resole resin reactive with said novolac resin, and optionally, hexamine present in an amount of up to about 5 parts by weight based on 100 parts by weight of the total amount of resin. The use of a lubricant-containing solid resole resin as a curing agent for the novolac resin in the preparation of resin-coated sand compositions provides satisfactory hot flow without substantial adverse blocking effects, and also provides the following significant advantages:

(1) The substantial absence of defective castings and disagreeable odors due to gas formation;

(2) Satisfactory hot flow and uniform mixing of the lubricant-containing resole with the novolac due to the presence of the lubricant, and satisfactory cure speed due to a higher content of reactive radicals in the solid resole resin;

(3) A higher crosslinking density, and a resulting increase in strength of the molded articles, due to the use of a novolac resin in combination with a solid resole resin having a higher content of reactive radicals; and (4) The lack of, or very limited need for, the addition of a lubricant, such as calcium stearate, in the blending process for the preparation of resin-coated sand compositions thus facilitating the blending operation.

DESCRIPTION OF THE PREFERRED EMBODIMENTS

The lubricant-containing solid resole resin employed in the present invention may be obtained by incorporating a lubricant into the base resin prepared by reacting 1 mole of phenol with at least 1 mole of formaldehyde in the presence of an alkaline catalyst.

Suitable solid resole resins include ammonia solid resole resins, prepared by using an amine catalyst such a ammonia or an amine compound, solid resole resins prepared by the combined use of an amine catalyst and an alkali metal catalyst, and solid resole resins prepared by using an alkali metal catalyst alone.

The phenolic reactant employed in the present invention to prepare the novolac or resole resin can be phenol, an alkylphenol such as m-cresol, p-cresol, xylenol or mixtures thereof.

As source of formaldehyde, in addition to formalin, formaldehyde polymers such as paraformaldehyde or trioxane, or mixtures thereof, can be advantageously employed. In addition, hexamine can be employed not only as a catalyst, but also in combination with ammonia as a source of formaldehyde.

Examples of amine compounds applicable as amine catalysts are monomethylamine, triethylamine, ethanolamine, aniline, etc.

Typical examples of suitable alkali metal catalysts are hydroxides and oxides of alkali metals such as sodium, potassium and lithium, and hydroxides and oxides of alkali earth metals such as barium, calcium and magnesium.

Typical examples of suitable lubricants are carnauba wax, montan wax, paraffin wax, polyethylene wax, aliphatic amides such as ethylene bis-stearamide, methylene bis-stearamide, oxystearamide, stearamides, linoleic amide, etc., aliphatic acid salts such as calcium stearate, rosin, "Vinsol" resin (a complex thermoplastic mixture derived from southern pinewood comprising phenolic constituents in the form of substituted phenolic ethers, polyphenols and phenols of high molecular weight), polyethyleneglycol, polystyrene, talc, etc. The preferred lubricant is an aliphatic amide or polyethylene wax.

Such a lubricant can be added prior to, during, or after the preparation of the solid resole resin to obtain a lubricant-containing solid resole resin. in order to achieve a homogeneous dispersion, the lubricant is added preferably prior to or during the reaction and preferably in the form of a dispersion. The amount of lubricant employed may vary within a range of about 0.5 to about 10 parts by weight based on 100 parts by weight of the solid resole resin, and preferably within a range of about 1 to about 7 parts by weight to achieve a more satisfactory hot flow and cure speed.

The following examples will serve to illustrate the process for producing the lubricant-containing solid resole resin of the present invention:

(1) One mole of phenol and 1-3 moles of formaldehyde are placed in a reactor, and an alkaline catalyst is added thereto prior to the addition of a lubricant. The mixture thus obtained is subjected to a condensation reaction for about 30 minutes to 2 hours at a temperature of 50° C. to 100° C. (The lubricant is preferably added after completion of the condensation reaction or subsequently during the course of dehydration.) The reaction mixture is then subjected to dehydration under reduced pressure and at a temperature not exceeding 100° C. to obtain a high viscous yellow or brownish-yellow resin, which is removed from the reactor, rapidly cooled and crushed to obtain a lubricant-containing solid resole resin in solid state.

(2) One mole of phenol and 1-3 moles of formaldehyde are placed in a reactor and an alkaline catalyst is added. The mixture obtained is subjected to a condensation reaction for about 30 minutes to 2 hours at a temperature of 50° C. to 100° C. A dispersion of a lubricant is then added to the reaction mixture with a silane coupling agent, such as aminosilane or epoxysilane, and rapidly dried to obtain a lubricant-containing solid resole resin in flake or granular form.

(3) A lubricant-containing solid resole resin can also be obtained by incorporating a lubricant into a solid resole resin modified by a modifier capable of reacting with formaldehyde such as resorcin, urea, melamine, cashew nut shell oil, etc.

The novolac resin employed in the present invention is a solid condensate with a melting point of 70° C. to 100° C. prepared by the reaction of phenol and formaldehyde in the presence of an organic or inorganic acid catalyst such as oxalic acid, hydrochloric acid, sulfuric acid, p-toluenesulfonic acid or zinc acetate, followed by dehydration, said condensate being obtainable in flake, granular or rod shaped forms. Furthermore, in addition to ordinary novolac resins, so-called high ortho-novolac resins are also included in the novolac resins employed in the present invention. The preparation of suitable high ortho-novolac resins is fully described in U.S. Pat. No. 3,425,989, to Shepard et al., the disclosure of which is incorporated herein by reference.

The novolac resin thus obtained is a thermoplastic. Hexamine is a representative curing agent for the novolac, but it is associated, as explained in the foregoing, with certain disadvantages such as defects in cast products and with disagreeable odors due to the formation of gas. Also, as explained in the foregoing, a solid resole resin in unsatisfactory as a curing agent due to its slow cure speed, although it is not associated with the above-mentioned disadvantages.

The amount of novolac employed should preferably be in the range of about 1 part by weight to about 30 parts by weight based on 100 parts by weight of the total amount of resin employed. The upper limit can be increased to about 40 parts by weight if hexamine is employed.

The resin-coated sand compositions of the present invention can be prepared by placing sand, preheated to 120° C. to 140° C., i.e. at an elevated temperature sufficient to fluidize the solid resin into a muller, adding a novolac resin in flake, granular or rod shaped form, further adding the lubricant-containing solid resole resin of the present invention, and if necessary, adding a small amount of hexamine dissolved in the cooling water, and continuing the mulling until the sand lumps are crushed, with the addition, when required, of a small amount of calcium stearate. The total resin content of the sand composition will preferably be in the range of about 2 to about 5 parts by weight based on 100 parts by weight of sand.

The present invention will be further elucidated by the following examples which are not intended to limit the scope thereof. The amounts and percentages in the specification and claims are represented by parts by weight and percent by weight unless specifically defined otherwise.

EXAMPLE 1

2000 parts of phenol and 1350 parts of 37% formalin were placed in a reactor, and 15 parts of 10% hydrochloric acid was added. The mixture was heated to 100° C. and reacted under reflux for 3 hours. The reaction mixture was subjected, successively, by dehydration under a reduced pressure of 30-65 cmHg, then removed from the reactor when the internal temperature rose to 160° C., allowed to cool, and crushed to obtain a novolac resin in granular form.

EXAMPLE 2

2000 parts of phenol and 2590 parts of 37% formalin were placed in a reactor, and 160 parts of a 28% ammonia solution was added. The mixture was gradually heated to 100° C. and reacted under reflux for 30 minutes. After the addition and mixing of 100 parts of methylene bis-stearamide, the reaction mixture was subjected to dehydration under a reduced pressure of 30-50 cmHg, then removed from the reactor when the internal temperature rose to 82° C., rapidly cooled and crushed to obtain a solid resole resin with a melting point of 97° C. in granular form. The solid resole resin thus obtained was found to have no blocking characteristics.

EXAMPLE 3

2000 parts of phenol and 2590 parts of 37% formalin were placed in a reactor, and 160 parts of a 28% aqueous ammonia solution and 60 parts of a 50% aqueous solution of sodium hydroxide were added. The mixture was gradually heated to 100° C. and reacted under reflux for 30 minutes. After the addition of 100 parts of ethylene bis-stearamide and dispersion by admixture, the mixture was subjected to dehydration under a reduced pressure, then removed from the reactor when the internal temperature reached 82° C., cooled rapidly and crushed to obtain a solid resole resin with a melting point of 97° C. in granular form. The solid resole resin thus obtained was found to have no blocking characteristics.

REFERENCE EXAMPLE 1

2000 parts of phenol and 2590 parts of 37% formalin were placed in a reactor, and 160 parts of a 28% aqueous ammonia solution was added. The mixture was gradually heated to 100° C. and reacted under reflux for 30 minutes. The mixture was subjected successively, to dehydration under a reduced pressure of 30–50 cmHg, removed from the reactor when the internal temperature rose to 95° C. cooled rapidly and crushed to obtain a solid resole resin having a melting point of 85° C. in granular form.

The conditions for preparation of resin-coated sand compositions, together with the properties thereof, based on the novolac resin obtained in Example 1 and the solid resole resin obtained in Examples 2 or 3, or Reference Example 1, in some cases with hexamine, are summarized in Table 1 below.

The method of preparation of the resin-coated sand and the methods of testing were as follows:

1. Preparation of resin-coated sand:

30 Kg of "Ayaragi" silica sand preheated to 130°–140° C. was placed in a Whal mixer. A novolac resin (Example 1) and a solid resole resin were added and mulled with the silica sand for 40 seconds. 450 g of water (in which a predetermined amount of hexamine, if required, is dissolved) was added, and mulling was continued until the sand particles were crushed. After the addition of 20 g of calcium stearate, the mixture was further mulled for 20 seconds, then removed from the mixer and aerated to obtain the resin-coated sand.

2. Test methods:

| | |
|---|---|
| Bending strength (kg/cm$^2$) | JACT test method SM-1 |
| Sticking point | JACT test method C-1 |
| Hot tensile strength (kg/cm$^2$) | JACT test method SM-10 |

From the results in the foregoing and in Table 1, it will be observed that, in order to achieve a higher strength and a faster cure (represented by the hot tensile strength value at 30 and 60 seconds), a lubricant-containing solid resole resin prepared using a mixture of ammonia and an alkali metal catalyst in combination is preferred to that prepared with an ammonia catalyst alone.

TABLE 1

| | RUN | | | | CONTROL RUN | | |
|---|---|---|---|---|---|---|---|
| | 1 | 2 | 3 | 4 | 1 | 2 | 3 |
| Conditions of preparation of resin-coated sand | | | | | | | |
| Ex. 1 (novolac) (g) | 250 | 250 | 350 | 350 | 250 | 350 | 900 |
| Ex. 2 (solid resole resin of the present invention) (g) | 650 | — | — | — | — | — | — |
| Ex. 3 (solid resole resin of the present invention) (g) | — | 650 | 550 | 550 | — | — | — |
| Ref. Ex. 1 (solid ammonia resole resin) (g) | — | — | — | — | 650 | 650 | — |
| Hexamine | — | — | 27 | 45 | — | 45 | 135 |
| Properties of resin-coated sand | | | | | | | |
| Bending strength (kg/cm$^2$) | 44.9 | 46.5 | 43.7 | 42.5 | 35.5 | 33.2 | 43.3 |
| Sticking point (°C.) | 103 | 102 | 104 | 104 | 100 | 103 | 107 |
| Hot tensile strength (kg/cm$^2$) | | | | | | | |
| 30 sec. | 1.8 | 2.4 | 1.7 | 1.8 | 1.1 | 1.4 | 2.1 |
| 60 sec. | 6.5 | 7.3 | 6.7 | 6.9 | 4.3 | 4.9 | 6.9 |
| 240 sec. | 19.5 | 22.1 | 20.3 | 19.8 | 14.5 | 15.3 | 20.6 |

We claim:

1. In the process for preparation of a composition useful as a foundry core or mold consisting essentially of sand and a phenolic resin wherein a mixture of the phenolic resin consisting of solid particles and sand at an elevated temperature sufficient to fluidize said solid resin are mulled to coat the sand with said resin, the improvement wherein the solid phenolic resin comprises a solid novolac phenolic resin and a lubricant-containing solid resole phenolic resin produced by the reaction comprising condensation of a phenol and a formaldehyde source followed by dehydration of the reaction mixture wherein the lubricant is added prior to or during said reaction to produce the solid resole phenolic resin, the novolac resin constituting about 1 to about 40 parts by weight per 100 parts by weight of the phenolic resin, and the lubricant-containing resole phenolic resin constituting the balance of the phenolic resin component, the proportion of the total phenolic resin being about 2 to about 5 parts by weight per 100 parts by weight of the sand and the proportion of lubricant in the resole resin component being about 0.5 to about 10 parts by weight per 100 parts by weight of the resole resin component.

2. The process of claim 1 wherein the lubricant is selected from the group consisting of carnauba wax, montan wax, paraffin wax, polyethylene wax, aliphatic amides, rosin, a complex thermoplastic mixture derived from southern pinewood comprising phenolic constituents in the form of substituted phenolic ethers, polyphenols and phenols of high molecular weight, polyethyleneglycol, polystyrene, talc, and mixtures thereof.

3. The process of claim 2 wherein the lubricant is an aliphatic amide or a polyethylene wax.

4. The process of claim 1 wherein the novolac resin comprises a condensation product of phenol and formaldehyde.

5. The process of claim 1 wherein the resole resin comprises a condensation product of phenol and formaldehyde.

6. The process of claim 1 wherein the temperature of the sand is 120° C.–140° C.

7. The process of claim 6 wherein the novolac resin is present in an amount of about 1 to about 30 parts by weight based on 100 parts by weight of the total resin content.

8. A product useful as a foundry sand core or mold prepared by the process of claim 7.

9. The process of claim 7 wherein the lubricant is present in an amount of about 1 to about 7 parts by weight based on 100 parts by weight of resole resin.

10. The process of claim 1 wherein the lubricant-containing resole resin also includes a silane coupling agent.

11. The process of claim 1 wherein the mixture of sand and resin also includes hexamine in an amount of up to about 5 parts by weight based on 100 parts by weight of the total resin.

12. A product useful as a foundry sand core or mold prepared by the process of claim 11.

13. A product useful as a foundry sand core or mold prepared by the process of claim 1.

14. The process of claim 1 wherein the lubricant is added after completion of the condensation step of the reaction to produce the solid resole phenolic resin.

15. A product useful as a sand core or mold prepared by the process of claim 14.

* * * * *